(12) United States Patent
Hao et al.

(10) Patent No.: US 9,792,377 B2
(45) Date of Patent: Oct. 17, 2017

(54) SENTIMENT TRENT VISUALIZATION RELATING TO AN EVENT OCCURING IN A PARTICULAR GEOGRAPHIC REGION

(75) Inventors: Ming C Hao, Palo Alto, CA (US); Umeshwar Dayal, Saratoga, CA (US); Bao-Yao Zhou, Beijing (CN); Cheng Chang, Beijing (CN); Meichun Hsu, Los Altos Hills, CA (US); Mohamed E Dekhil, Santa Clara, CA (US); Riddhiman Ghosh, Sunnyvale, CA (US); Christian Rohrdantz, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 825 days.

(21) Appl. No.: 14/122,357

(22) PCT Filed: Jun. 8, 2011

(86) PCT No.: PCT/CN2011/000957
§ 371 (c)(1),
(2), (4) Date: Jun. 17, 2014

(87) PCT Pub. No.: WO2012/167399
PCT Pub. Date: Dec. 13, 2012

(65) Prior Publication Data
US 2014/0344243 A1 Nov. 20, 2014

(51) Int. Cl.
*G06F 17/30* (2006.01)
*G06Q 30/02* (2012.01)
(52) U.S. Cl.
CPC .... *G06F 17/3087* (2013.01); *G06F 17/30241* (2013.01); *G06F 17/30696* (2013.01); *G06F 17/30734* (2013.01); *G06Q 30/0205* (2013.01)

(58) Field of Classification Search
None
See application file for complete search history.

(56) References Cited

U.S. PATENT DOCUMENTS 7,600,017 B2 10/2009 Holtzman et al.
2008/0033587 A1 2/2008 Kurita et al.
(Continued)

FOREIGN PATENT DOCUMENTS

JP 2007-018285 1/2007
WO WO2009/087636 7/2009

OTHER PUBLICATIONS

Balahur et al., IEEE Computer Society 2009, Opinion Mining on Newspaper Quotations. 2009 (4 pages).
(Continued)

*Primary Examiner* — Anh Tai Tran
(74) *Attorney, Agent, or Firm* — Trop, Pruner & Hu, P.C.

(57) ABSTRACT

An event occurring in a particular geographic region is identified based on disseminated information containing public commentary in the particular geographic region. Attributes that are related to the event are identified, and sentiment words relating to the identified event are extracted from the disseminated information, where the extracted sentiment words are in a local language of the particular geographic region. A sentiment trend visualization is generated that depicts a trend of sentiments of at least a particular one of the identified attributes, wherein the sentiments are based on the sentiment words for at least the particular attribute.

20 Claims, 6 Drawing Sheets

(56) References Cited

U.S. PATENT DOCUMENTS

| | | |
|---|---|---|
| 2008/0162238 A1 | 7/2008 | Subbu et al. |
| 2008/0215571 A1 | 9/2008 | Huang et al. |
| 2008/0250326 A1 | 10/2008 | Mather |
| 2009/0048823 A1 | 2/2009 | Liu |
| 2009/0193328 A1 | 7/2009 | Reis |
| 2009/0265307 A1 | 10/2009 | Reisman |
| 2010/0023311 A1 | 1/2010 | Subrahmanian |
| 2010/0119053 A1* | 5/2010 | Goeldi .................. G06Q 10/00 379/265.09 |
| 2010/0121707 A1 | 5/2010 | Goeldi |
| 2010/0306192 A1 | 12/2010 | Kapur |
| 2010/0332465 A1* | 12/2010 | Janssens ................ G06Q 30/02 707/722 |

OTHER PUBLICATIONS

Gawalt et al., ACM, Discovering Word Associations in News Media via Feature Selection and Sparse Classification, Mar. 2010 (pp. 211-220).

Goorha et al., ACM Digital Library—Abstract, Discovery of Significant Emerging Trends, Jul. 2010 (1 page).

Hao et al., U.S. Appl. No. 12/925,684 entitled "Visual Analysis of a Time Sequence of Events Using a Time Density Track" filed Oct. 27, 2010 (29 pages).

Hao et al., U.S. Appl. No. 13/155,570 entitled "Selecting Sentiment Attributes for Visualization" filed Jun. 8, 2011 (39 pages).

Miao et al., 2008 IEEE/WIC/ACM International Conference on Web intelligence and Intelligent Agent 'Technology, "A Unified Framework for Opinion Retrieval", 2008 (pp. 739-742).

Shi et al., Research Article—Science Alert—An Attribute-based Sentiment Analysis System, Aug. 2010 (9 pages).

Sysomos (www.sysomos.com) Best Global Brands Online, Oct. 2009 (4 pages).

Wanner et al., Large-scale Comparative Sentiment Analysis of News Articles, 2009 (2 pages).

Yingcai Wu, OpinionSeer: Interactive Visualization of Hotel Customer Feedback, IEEE, Oct. 2010 (10 pages).

Zhang et al., ACM Digital Library—Abstract, Sentiment Analysis of Chinese Documents: From Sentence to Document Level, Dec. 2009 (1 page).

Zhang et al., IEEE Computer Society 2009, Improving Movie Gross Prediction Through News Analysis, 2009 (pp. 301-304).

Abbasi et al., ACM Transactions on Information Systems, vol. 26, No. 3, Article 12, Sentiment Analysis in Multiple Languages: Feature Selection for Opinion Classification in Web Forums, Jun. 2008 (34 pages).

Ahmed Abbasi; "Sentiment Analysis in Multiple Languages: Feature Selection for Opinion Classification in Web Forums"; http://portal.acm.org/citation.cfm?d=1361684.1361685&coll=GUIDE &dl=GUIDE&CFID=102690532&CFTOKEN=53223085 > Jun. 2008; vol. 26.

Alexandra Balahur; Ralf Steinburger; Erik van der Goot; Bruno Pouliquen; Mijail Kabadjov; "Opinion Mining on Newspaper Quotations"; http://portal.acm.org/citation.cfm?id=1632475 &dl=GUIDE&coll=GUIDE&CFID=102690532 &CFTOKEN=53223085 >2009; On pp. 301-304.

Balahur et al., IEEE Computer Society 2009. Opinion Mining on Newspaper Quotations, 2008 (4 pages).

Brian Gawait; "Discovering Word Associations in News Media via Feature Selection and Sparse Classification"; http://portal.acm.org/citation.cfm? id=1743421&dl=GUIDE&coll=GUIDE &CFID=102690532&CFTOKEN=53223085 > 2010; On pp. 211-220.

Castellanos et al., U.S. Receiving Office, International Appl. No. PCT/US11/39566, entitled "Determining and Visualizing Social Media Expressed Sentiment" filed Jun. 8, 2011 (25 pages).

Changli Zhang; Daniel Zeng; Jiexun Li; Fei-Yue Wang; Wanli Zuo; "Sentiment Analysis of Chinese Documents; from Sentence to Document Level"; http://portal.acm.org/citation.cfm?id=1673010 &dl=GUIDE&coll=GUIDE&CFID=102690532 &CFTOKEN=53223085 > Dec. 2009.

Crimson Hexagon Products (www.crimsonhexagon.com). Major Enhancement to Crimson Hexagon Platform Delivers Groundbreaking New Social Media Monitoring and Analysis Capabilities, Oct. 2010 (2 pages).

Duan et al., Computer Science, Advances in Knowledge Discovery and Data Mining, SpringerLink—Abstract, CCRM: An Effective Algorithm for Mining Commodity Information from Threaded Chinese Customer Reviews, 2007 (1 page).

F. Wanner et al.; "Large-scale Comparative Sentiment Analysis of News Articles"; http://www.inf.uni-konstanz.de/cgip/bib/files/WaRoMa09b.pdf >, IEEE Symposium on Information Visualization, 2009.

International Searching Authority, the international Search Report and the Written Opinion, dated Feb. 9, 2012, PCT/CN2011/000957, 10 Pgs.

* cited by examiner

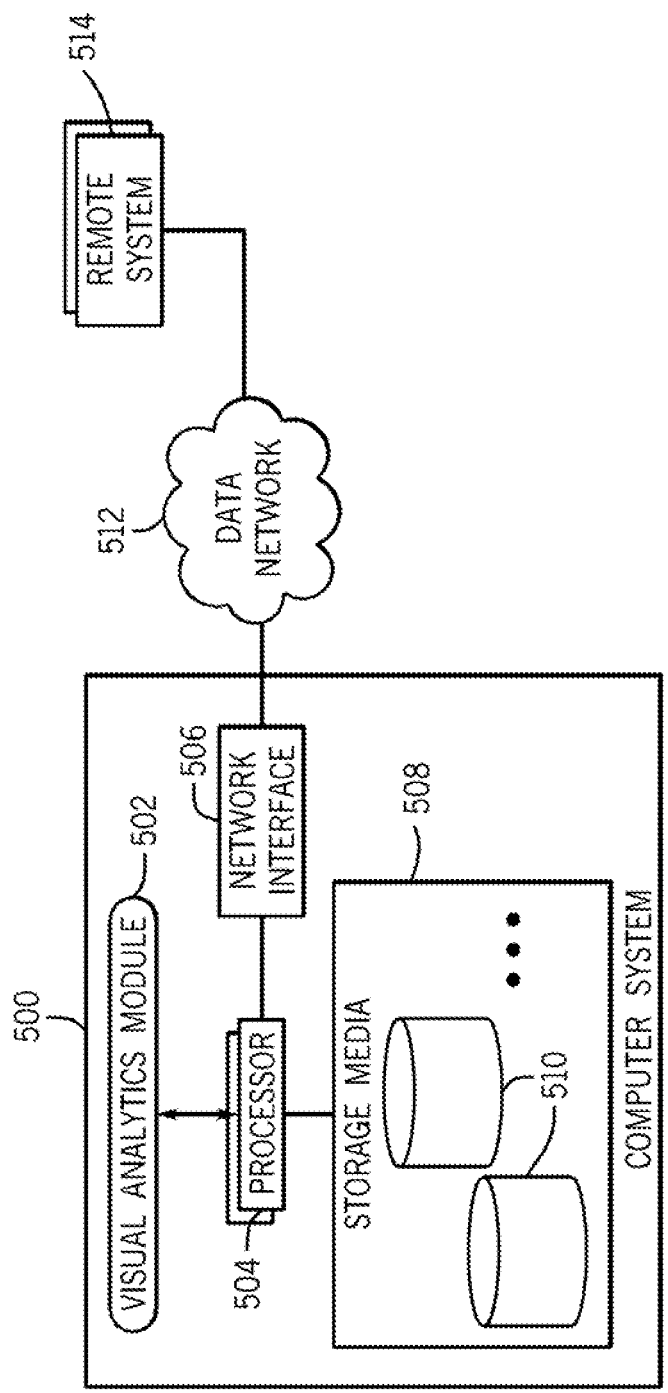

SENTIMENT TRENT VISUALIZATION RELATING TO AN EVENT OCCURING IN A PARTICULAR GEOGRAPHIC REGION

BACKGROUND

Various information can be disseminated with respect to an event, where examples of such disseminated information include news articles (such as articles published by news websites or other news outlets), blogs, online reviews (e.g. customer reviews of products or services), or other types of information. Depending upon the seventy of the event or interest of people in the event, there can be a relatively large amount of disseminated information relating to the event.

BRIEF DESCRIPTION OF THE DRAWINGS

Some embodiments are described with respect to the following figures:

FIG. 5 is a block diagram of the example system incorporating some implementations.

DETAILED DESCRIPTION

Figure 1:
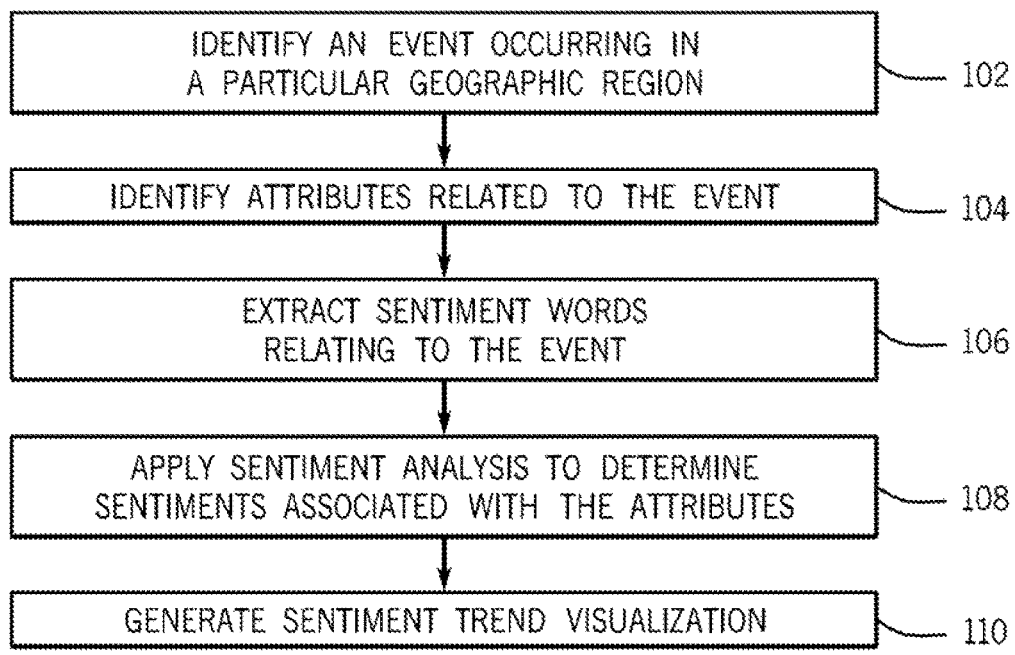
FIG. 1 is a flow diagram of a sentiment trend visualization process according to some implementations.

For a given event that occurs in a particular geographic region (referred to as "local geographic region" in the ensuing discussion), there can be a relatively large amount of public information disseminated (e.g. published or otherwise made available to people who have an interest) that may relate to the event. Generally, an "event" refers to an activity, problem, failure, or any other issue. For example, an enterprise (e.g. company, educational organization, government agency, etc.) may have an offering (a product or a service) in a particular market, such as a market within a specific country or region of a country. Due to an event (e.g. problem) associated with the offering, various sources may disseminate information regarding public commentary about such problem. "Public commentary" refers to any expression, such as a review, feedback, news article, blog, and so forth expressed in public forum(s).

News sites may publish news articles regarding the problem associated with the offering. There can also be blogs that discuss the problem associated with the offering. Customer review websites (websites that allow users to enter their feedback about specific products or services) can also provide reviews regarding the offering. Other information disseminators can include social networking sites such as Facebook™ and Twitter™.

With the relatively large volume of disseminated information containing public commentary about an event, it can be time-consuming and difficult for users (e.g. sales or marketing personnel, analysts, etc.) to manually read through the disseminated information to understand sentiments of individuals with respect to the event, such as a problem associated with an offering of an enterprise. In fact, disseminated information relating to an event can be in the local language of the local geographic region in which the event occurred. Alternatively, the disseminated information relating to the event can be in multiple languages, such as the local language and another language (e.g. English).

The sentiments associated with an event may include positive sentiments, negative sentiments, or neutral sentiments. A "sentiment" refers to an attitude, opinion, or judgment of a human with respect to a specific event.

In accordance with some implementations, sentiment visualization mechanisms or techniques are providing to allow for automated analysis and visualization of multiple sources of disseminated information containing public commentary about one or multiple events occurring in a local geographic region. The sentiment visualization assists users in better understanding sentiments associated with the one or multiple events. In accordance with some implementations, the sentiment visualization is focused on local geographic regions, such as specific countries, states, provinces, cities, and so forth. Thus, rather than processing sources of information regarding particular event(s) disseminated across the world, the sentiment visualization mechanisms or techniques according to some implementations are able to focus on specific local geographic regions of interest.

FIG. 1 is a flow diagram of a process according to some implementations of performing sentiment analysis in a local geographic region. The process includes identifying (at 102) an event occurring in the local geographic region, where the identifying of the event is based on disseminated information containing public commentary in the local geographic region. For example, the disseminated information can be from local news outlets (local news websites, local newspapers, local television or radio stations, etc.). The disseminated information can also be from local blogs or local social networking posts, where a local blog or a local social networking post refers to a blog or post that focuses on events of the local geographic region. The disseminated information can be received in the form of data records, where each data record contains respective commentary provided by the different sources of information, e.g. news outlets, blogs, social networking posts, etc.

The identified event can be an event that was previously not known to an analyst (a person who is interested in understanding user sentiment). For example, an enterprise may be selling a product in a local geographic region. The product may exhibit a problem that is being experienced by a large number of users (but this problem is not yet known to the enterprise). As information about this problem becomes disseminated, the problem can be discovered and identified. Thus, according to some implementations, not only can past events be identified, but potential events can also be identified for sentiment analysis. A potential event can be an event that is not known by an analyst (or enterprise) to exist, but is likely to happen or is in the process of occurring.

The process of FIG. 1 further identifies (at 104) attributes that are related to the event. The attributes are found in the disseminated information (in the received data records), and the identified attributes are those attributes satisfying predefined one or multiple criteria. An attribute can be a noun or compound noun (a noun formed of multiple words, such as "customer service") that exists in the disseminated information. Alternatively, an attribute can be derived from nouns or compound nouns in the disseminated information. Another criterion for selecting an attribute can be that the attribute should be associated with sentiment words, where a "sentiment word" refers to any word or phrase found in the disseminated information that expresses sentiments of individuals. Elements in the disseminated information that are not associated with sentiment words can be disregarded as not being useful attributes.

Sentiment words in the local language are extracted (at 106) from the disseminated information. Sentiment words include individual words or phrases (made up of multiple words) that express an attitude, opinion, or judgment of a human. Examples of sentiment words include "bad," "poor," "great performance," "fast service," and so forth. Based on the sentiment words and the identified attributes, sentiment analysis can be applied (at 108) to determine the sentiments associated with the attributes in the local geographic region. The sentiment analysis can use any one of various sentiment analyzers that are generally available.

A sentiment trend visualization is then generated (at 110) that depicts a trend of the determined sentiments of at least one of the identified attributes. The sentiment trend visualization can also depict multiple ones of the identified attributes.

Figure 2:
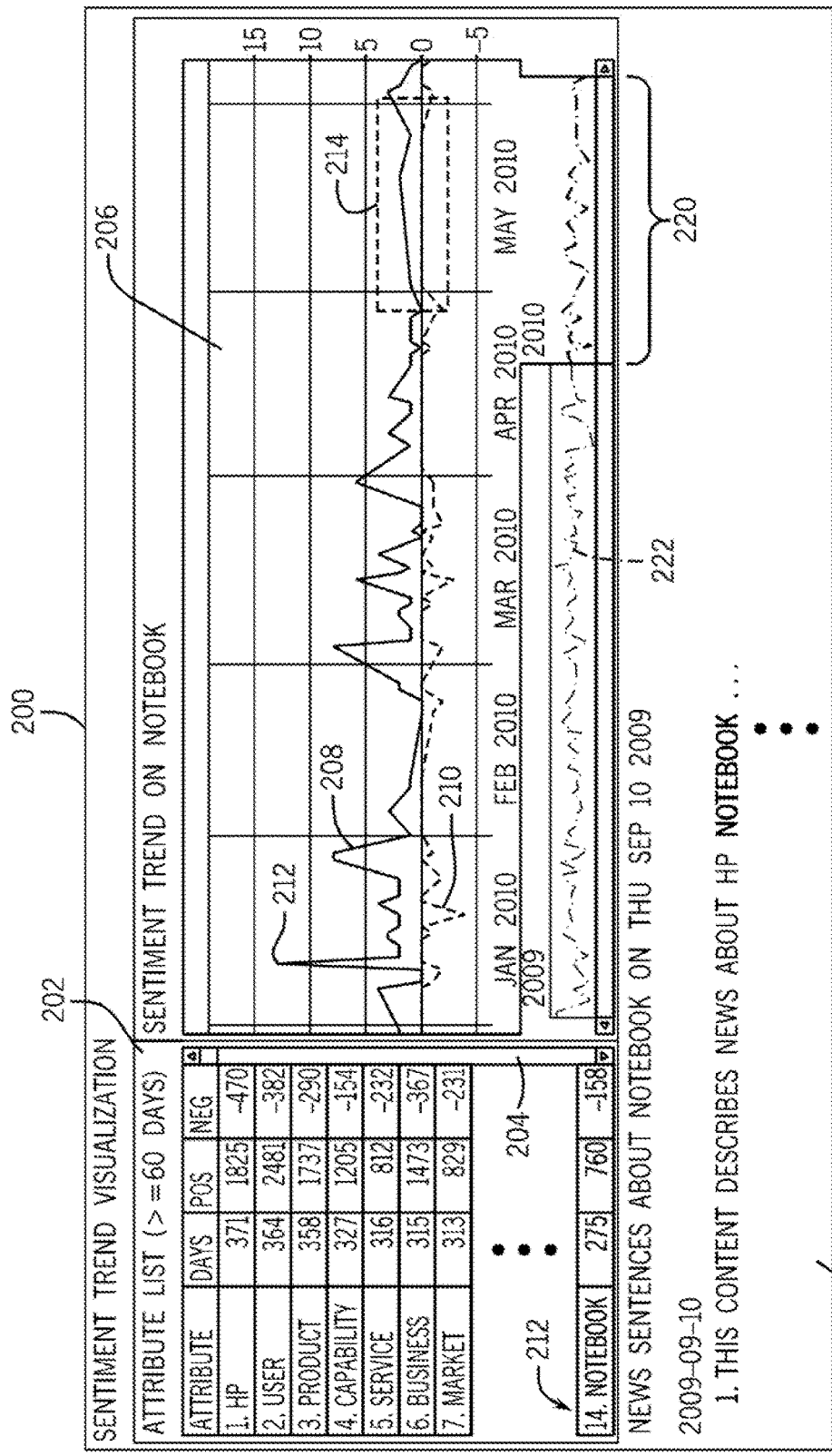
FIGS. 2, 3A, and 3B depict graphical representations of visualizations according to various implementations.

FIG. 2 is a graphical representation of an example sentiment trend visualization 200 that can be generated according to task 110 in FIG. 1. The sentiment trend visualization 200 includes various display areas, including an attribute list area 202 that contains a list of attributes that can be ordered according to some importance factor. The ordering allows the more important attributes to be provided at the upper portion of the attribute list, while the less important attributes are lowered down in the attribute list. To view the less important attributes, a user can use a scroll bar 204 (shown on the right of the attribute list) to scroll through the attribute list in the attribute list area 202.

A trend graph area 206 is also part of the sentiment trend visualization 200. In the example of FIG. 2, a first graph 208 depicts positive sentiments associated with a particular attribute, while a second graph 210 depicts negative sentiments associated with the same particular attribute. In the example of FIG. 2, the particular attribute associated with the graphs 208 and 210 is the highlighted attribute 212 ("notebook" attribute) in the attribute list area 202.

The horizontal axis of each graph 208, 210 depicted in the sentiment trend graph area 206 represents time, whereas the vertical axis of each graph represents an aggregate sentiment score. In the example of FIG. 2, vertical dividing lines are shown in the trend graph area 206 to divide the total time period represented by graphs 208, 210 into discrete months (January through May 2010 in the example of FIG. 2).

Each point on the graph 208 or 210 can represent a respective aggregate score, derived by aggregating (e.g. summing or performing some other aggregate, such as averaging, identifying a median, etc.) sentiment scores associated with different data records within some predefined time interval, such as one hour, one day, one week, etc. Thus, the points along each graph 208 or 210 can be thought of as points in successive time intervals, where within each time interval, sentiment scores for the respective attribute (where each sentiment score is computed based on content of the data records) are aggregated to produce an aggregate score that is plotted on the graph. For example, point 212 of the positive graph 208 indicates a high positive aggregate sentiment score within a time interval (e.g. one hour, one day, etc.) in January 2010.

A user can quickly ascertain that the sentiment scores associated with the attribute being depicted in the trend graph area 206 are generally more positive than negative (the positive aggregate scores on the positive graph 208 are generally larger than the negative aggregate scores on the negative graph 210). Also, the graphs 208 and 210 indicate that stronger sentiments were expressed earlier in 2010 (January through first part of April), with sentiments being more neutral later in 2010 (in late April and in May). The graphs 208 and 210 have generally larger aggregate sentiment scores during the early part of 2010, and generally lower aggregate sentiment scores in the time frame depicted generally as 214 in FIG. 2 (which covers the latter part of April and May).

The time period displayed in the trend graph area 206 is selectable. A graph 222 below the trend graph area 206 extends over a larger time period-a user can select a portion of the graph 222 (such as portion 220) for further details to be displayed in the trend graph area 206. The graph 222 can be either a positive graph or negative graph.

The sentiment trend visualization 200 further includes a text display area 230, which can display actual text of commentary in one or multiple data records relating to the selected attribute 212 ("notebook" attribute).

Figure 3A:
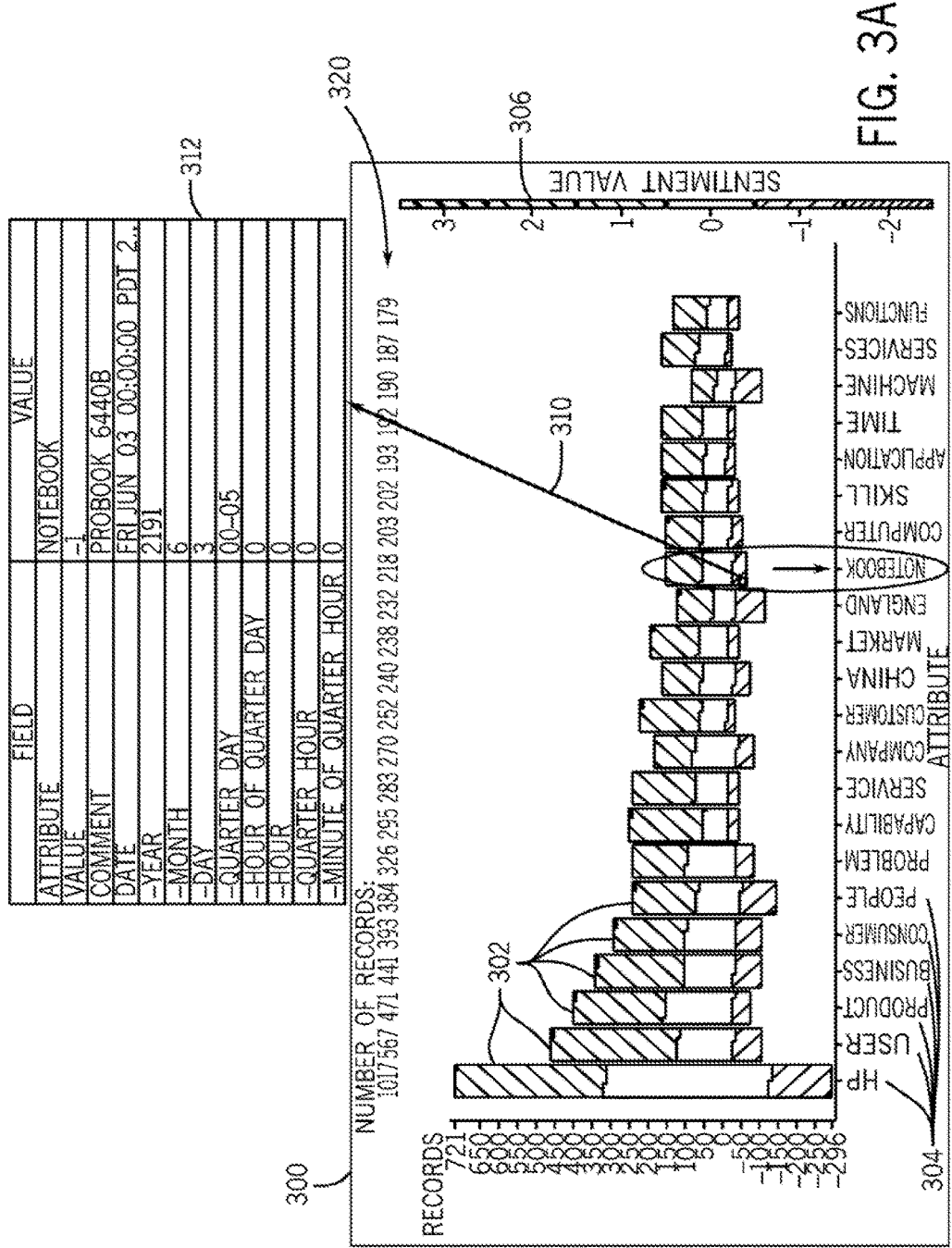

FIG. 3A depicts a different example sentiment trend visualization 300 that can be generated using trend visualization mechanisms or techniques according to some implementations. In FIG. 3A, various vertical bars are shown. Each vertical bar 302 corresponds to a respective attribute 304. The visualization 300 of FIG. 3A shows a trend over multiple attributes, whereas the visualization 200 of FIG. 2 shows a trend over time.

The horizontal axis of the visualization 300 represents different attributes, whereas the vertical axis represents numbers of positive and negative data records. As noted above, each data record represents a respective piece of disseminated information (e.g. news article, blog entry, social networking post, etc.). For a given attribute, a positive data record refers to a data record that expresses a positive sentiment regarding the given attribute, while a negative data record refers to a data record that expresses a negative sentiment regarding the given attribute. Note that a data record can contain sentiment words that express positive and negative sentiments regarding different attributes.

Each vertical bar 302 includes an arrangement of cells, where each cell represents a respective data record. Each cell is assigned a respective visual indicator, which in FIG. 3A is a respective color. The visual indicator (e.g. color) assigned to each cell depends upon the corresponding sentiment score associated with the respective attribute. A color scale 306 in FIG. 3A indicates what the different colors represent. According to the color scale 306, the green colors correspond to positive sentiment scores, whereas the pink/red colors correspond to negative sentiment scores. The gray color corresponds to a neutral sentiment score.

Within each bar 302, the cells associated with negative sentiment scores are provided in a first portion (e.g. lower portion of the bar), whereas the cells associated with positive sentiment scores are provided in a second portion (e.g. upper portion of the bar). The cells associated with neutral sentiment scores can be provided between the first and second portions. In alternative examples, the green cells can be provided at the lower portion of the bar, while the pink/red cells can be provided at the upper portion of the bar. Generally, the cells in each bar 302 are ordered according to respective sentiment scores associated with corresponding data records—such ordering allows the cells having similar or the same sentiment scores to be grouped together into the green portion, gray portion, and pink/red portion of each bar 302.

The vertical axis of FIG. 3A includes positive numbers and negative numbers. The positive numbers along the vertical axis indicates numbers of data records (positive data records) that have expressed positive sentiments for a given attribute, while the negative numbers along the vertical axis indicates numbers of data records (negative data records)

that have expressed negative sentiments for a given attribute. In the example of FIG. 3A, for the "HP" attribute, there are about 400 positive data records and about 170 negative data records.

The length of each bar 302 represents the total number of data records. A number is provided near the top of each bar 302 (a row 320 of numbers is shown in FIG. 3A). For the bar 302 corresponding to the "HP" attribute, the number "1017" indicates that the bar 302 contains cells representing 1017 data records. The bar 302 for to the "user" attribute includes cells corresponding to 567 data records, and the bar for the "product" attribute includes cells corresponding to 471 data records. The remaining bars 302 in the visualization 300 are also associated with respective total data record numbers.

Using the bar chart shown in the trend visualization 300 of FIG. 3A, a user can quickly determine which attribute is the one associated with the largest numbers of data records (i.e. largest number of sources of disseminated information). Also, for each attribute, a user can quickly determine whether the different sources of information are largely positive or negative or neutral.

The content of each cell can be depicted by moving a cursor over the respective cell. For example, arrow 310 in FIG. 3A indicates that a cursor has been moved over a particular cell, and the content of the data record corresponding to that cell is represented in a pop-up table 312. The pop-up table includes various fields and associated values for those fields. In the example of FIG. 3A, the pop-up table 312 is for a cell in the bar 302 for the "notebook" attribute.

Since the sentiment visualization according to some implementations is for a local geographic region, it is possible that the attributes found in the data records can be in a language other than English. The sentiment visualization techniques or mechanisms according to some implementations are able to provide visualization of attributes in a non-English language.

Figure 3B:
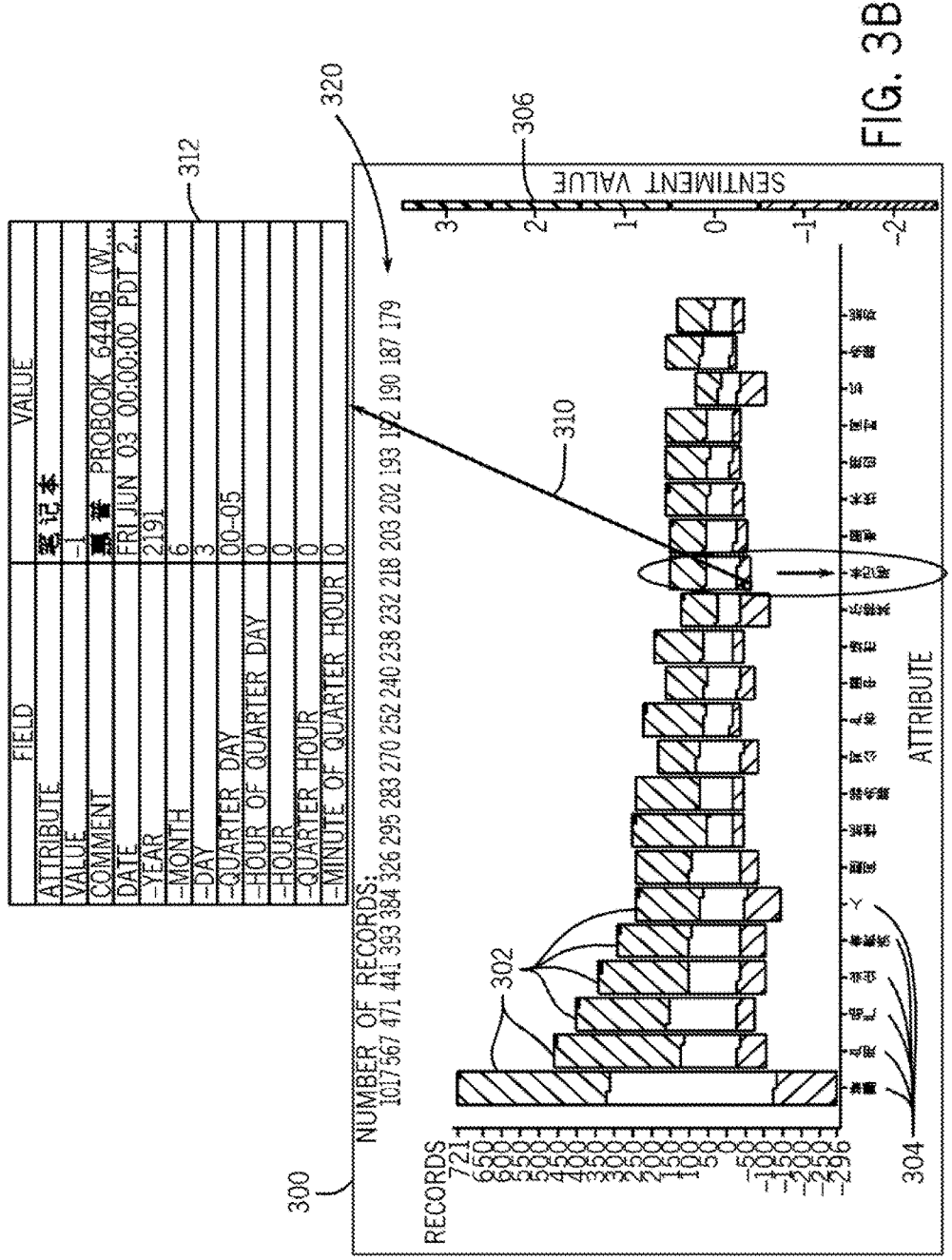

For example, FIG. 3B shows the same trend visualization 300 as in FIG. 3A, except that the attributes 304 are in the Chinese language (assuming that the local geographic region of interest is a Chinese-speaking country, such as China). The pop-up table 312 also contains some values that are in the Chinese language.

Figure 4:
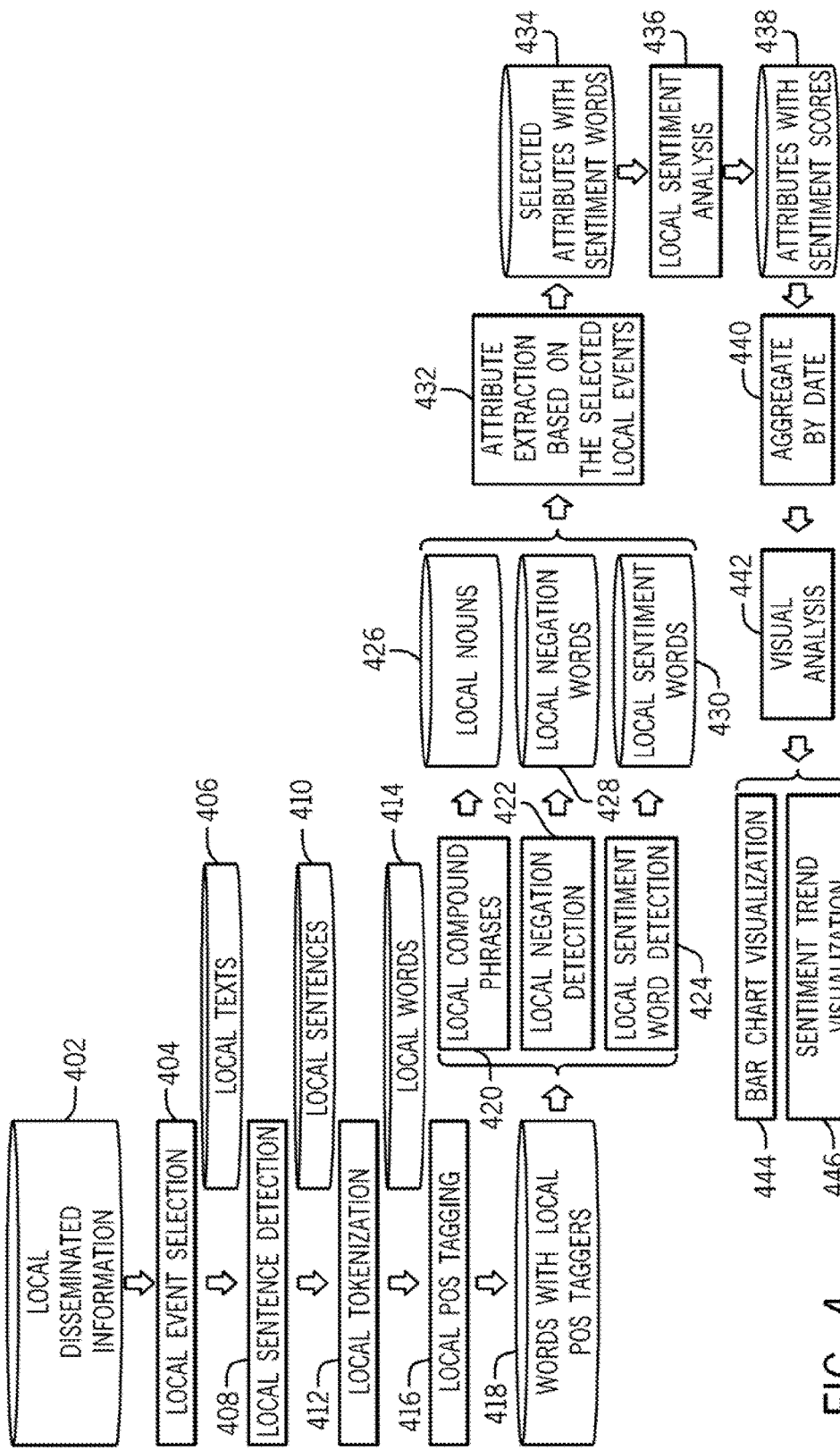
FIG. 4 is a flow diagram of a sentiment trend visualization process according to alternative implementations.

FIG. 4 is a flow diagram of a process according to further implementations. Local disseminated information 402 (in the form of data records) relating to a local geographic region is available in a database (or multiple databases). Also, the local disseminated information 402 can be continually received for analysis, such as from websites, social networking sites, and so forth.

From the local disseminated information 402, local event selection (404) is performed. Local event selection involves identifying at least one event based on the content of the local disseminated information 402. The identified at least one event can include known event(s) and/or potential event(s) (event(s) not yet known but are likely to occur or are in the process of occurring). Texts relating to the selected at least one event are stored (406).

Next, from the local disseminated information 402, local sentence detection (408) is performed to identify sentences in the local disseminated information. The identified local sentences (in the local language) are stored (410).

The local disseminated information 402 is also processed to perform local tokenization (412). Tokenization involves breaking an input collection of information (in this case the local disseminated information 402) into meaningful parts, such as words. In some implementations, the tokenization (412) employs a local dictionary (or local dictionaries) to assist in identifying words that can potentially constitute or define attributes that relate to the identified event(s). The local words derived from the tokenization are stored (414).

Next, local part-of-speech (POS) tagging (416) is performed on the identified local words. The POS tagging marks up (tags) words identified by the tokenization (412) with a corresponding part of speech (e.g. noun, verb, adverb, adjective, etc.). POS tagging can be based on a definition of the word (as extracted from a local dictionary) as well as a context of the word (e.g. relationship of the word with adjacent words in a phrase, sentence, or paragraph). After the POS tagging (416), the words with local POS tagging are stored (418).

Based on the POS-tagged words (stored at 418), the process of FIG. 4 can perform various processes, including detection of local compound phrases (420), detection of local negation (422), and detection of local sentiment words (424). The detection of local compound phrases (420) identifies nouns and noun phrases that potentially can be attributes that are related to the selected local event(s). Examples of identified nouns and noun phrases (stored at 426) include "notebook," "customer service," "problem," and so forth. These nouns and noun phrases can be attributes on which users have expressed sentiments that relate to the selected local event(s).

The detection of local negation (422) produces words that express negative sentiments (e.g. bad, poor, fast, etc.). Note that the word "fast" can express either a positive sentiment or negative sentiment, depending on the context. If "fast" is used in the context of describing customer service or product performance, then "fast" expresses a positive sentiment. On the other hand, if "fast" is used in the context of describing usage of an ink cartridge, then "fast" expresses a negative sentiment. Thus, the detection of local negation (422) is based on determining the appropriate context in which any sentiment word is expressed. The negation words (words that express a negative sentiment) are stored (428).

The detection of local sentiment words (424) identifies words or phrases including multiple words that express sentiments (whether positive, negative, or neutral). These words or phrases potentially can express sentiments regarding various attributes that relate to the selected event(s).

From the local nouns and/or noun phrases (stored at 426), the process of FIG. 4 performs attribute extraction (432) based on the selected event(s). Attribute extraction involves selecting a set of attributes from a larger group of candidate attributes. The selected attributes are stored (434). The stored selected attributes can be associated with corresponding sentiment words (from 430), where each sentiment word can be an individual word or a phrase.

The selection of attributes can involve selection of attributes that are considered to be the most important to the selected event(s). In some implementations, the selection of attributes can be based on various selection criteria, including, as examples, at least some combination of the following: a criterion relating to how frequently each attribute occurs in the input data records, a criterion relating to relative amounts of negative and positive feedback associated with each attribute, a criterion relating to time density of feedback associated with each attribute, a criterion relating to negativity associated with each attribute, and an application-specific criterion. "Feedback" refers to commentary provided about an attribute in each of the data records containing the local disseminated information 402.

The selection criterion for selecting an attribute from among multiple attributes relating to frequency of occurrence is referred to as a "high-frequency criterion". The frequency of occurrence of an attribute refers to how frequently the attribute occurs in the input data records. An attribute is considered to occur frequently in the input data records if an amount of occurrence of the attribute in the data records exceeds some predefined threshold. For example, the amount of occurrence of the attribute can be expressed as a percentage of the data records in which the attribute is present—thus, the attribute can be considered to be a high-frequency attribute if the percentage of data records in which the attribute appears is greater than some predefined percentage threshold. A high-frequency attribute is assigned a greater importance (e.g. higher importance score).

As listed above, another selection criterion considered in selecting attributes is relative amounts of negative and positive feedback associated with each attribute (referred to as a "large difference criterion"). A given attribute can have a first number of positive feedback and a second number of negative feedback. The number of positive or negative feedback can refer to the number of data records in which the attribute appears (such as within a particular time interval being studied) and for which users have expressed positive or negative feedback, respectively. The number of positive or negative feedback can also refer to the number of times that users have expressed positive or negative review, respectively, of the given attribute in the input data records. An attribute associated with a large difference between the number of positive feedback and the number of negative feedback is assigned greater importance (e.g. higher importance score).

As noted above, another selection criterion considered in selecting a subset of attributes from among candidate attributes is the time density of feedback associated with each attribute (referred to as a "time density criterion"). "Time density" refers to the average time gap between successive data records that contain feedback for a given attribute. For example, the average time gap between feedback for a first attribute may be X, while the average time gap between feedback data records for a second attribute is Y, where X<Y. In such an example, the first attribute is considered more important that the second attribute, since the average time gap between reviews for the first attribute is smaller than the average time gap for the second attribute. This is an indication that users are more interested in the first attribute (and thus have expressed more feedback on the first attribute). Alternatively, techniques can consider the change in time density—a sudden increase in time density of an attribute indicates that the attribute would be more important.

Another selection criterion is a criterion relating to negativity associated with each attribute. An attribute associated with greater negativity is assigned greater importance than another attribute with less negativity. The "negativity" of an attribute refers to the amount of negative feedback received for the given attribute. For example, within 1,000 data records, a first attribute may be associated with 500 negative reviews, whereas a second attribute may be associated with 100 negative reviews. In this case, this selection criterion (referred to as the "negativity criterion") would indicate that the first attribute would be more important than the second attribute. Alternatively, instead of a negativity criterion, a positive criterion can be more relevant in certain application—an attribute with a greater number of positive reviews would be more important.

Another selection criterion that can be considered for selecting a subset of attributes from among candidate attributes is the application-specific criterion. An "application-specific criterion" refers to a criterion indicating that, for a given application, certain attributes are more important than other attributes. For example, if the application is sentiment analysis for a notebook computer, then the application-specific criterion can specify a certain group of attributes that should be considered for analysis, such as price, CPU performance, display size, etc.

The multiple selection criteria (high-frequency criterion, large difference criterion, time density criterion, negativity criterion, and application-specific criterion) can be combined to assign an importance score to each candidate attribute. Each of the selection criteria causes an individual score to be produced for the candidate attribute. Such individual scores can be combined (such as by use of a weighted sum) to produce an overall score indicating the relative importance of the candidate attribute in user sentiment understanding. A weighted sum approach involves assigning respective weights to the individual scores (the weights are multiplied to the individual scores, and the weighted individual scores are summed to produce the overall score). The weights assigned can be equal weights, or alternatively, the weights assigned can be different.

Once attributes have been selected (and sentiment words have been associated with the selected attributes) and stored (at 434), local sentiment analysis (436) can be performed. Various available sentiment analyzers can be used to perform the sentiment analysis, given the selected attributes and associated sentiment words/phrases (434).

The local sentiment analysis (436) produces attributes with sentiment scores (stored at 438). As a result of the sentiment analysis (436), each of the selected attributes (selected at 432) is assigned a respective sentiment score.

The sentiment scores of an attribute can vary over time, as shown in FIG. 2. At a first point in time, users may provide more intense feedback regarding a given attribute (where "more intense" feedback refers to more positive or negative feedback associated with a sentiment score having a greater magnitude). Later, such as in response to a problem being resolved, the feedback becomes less intense.

In some cases, sentiment scores for each attribute can be aggregated (440) for each respective time interval (e.g. hour, day, week, etc.). For example, an attribute score for each attribute can be computed for each hour. However, to provide more meaningful visualization (or less clustered visualization), the sentiment scores computed in successive hours can be aggregated into an aggregate score for a given day (made up of 24 hours). Such aggregate scores are depicted in a trend visualization, such as the trend visualization 200 of FIG. 2.

The process of FIG. 4 next performs visual analysis (442) to produce one or multiple trend visualizations of the attributes and their associated sentiment scores. The visualizations include bar chart visualizations 444 (such as those shown in FIGS. 3A and 3B) and sentiment trend visualizations 446 (such as shown in FIG. 2).

By employing techniques and mechanisms according to some implementations, a sentiment trend of specific attributes relating to selected event(s) can be automatically discovered and can be visualized for convenient analysis, without having to manually read through potentially large amounts of disseminated information, which can be in a non-English language.

FIG. 5 shows an example computer system 500 (which can be implemented as an individual computer or as a distributed system of computers) that has a visual analytics module 502, which is capable of performing the tasks of FIGS. 1 and 4, for example. The visual analytics module 502 is executable on one or multiple processors 504, which is (are) connected to storage media 508 and to a network interface 506.

The storage media 508 store various information 510, such as those discussed above in connection with FIG. 4. The network interface 506 allows the computer system 500 to communicate over a data network 512 with remote systems 514. The remote systems 514 can be sources of disseminated information that can be retrieved by the computer system 500.

A processor can include a microprocessor, microcontroller, processor module or subsystem, programmable integrated circuit, programmable gate array, or another control or computing device.

The storage media 508 are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of determining sentiment trend visualization for localized events, the method being implemented on a system comprising a physical processor executing machine readable instructions, comprising:
    identifying, based on disseminated information from a first geographic region, an event occurring in the first geographic region, wherein the disseminated information from the first geographic region includes public commentary from the first geographic region;
    identifying a set of attributes that are related to the event;
    extracting a set of sentiment words relating to the identified event from the disseminated information, wherein the extracted set of sentiment words are in a local language of the first geographic region; and
    causing display, for a first attribute of the identified set of attributes, of a sentiment trend visualization that depicts a trend of determined sentiments for the first attribute, wherein the determined sentiments are based on the set of sentiment words for the first attribute.

2. The method of claim 1, wherein identifying the set of attributes comprises:
    determining a plurality of candidate attributes from the disseminated information;
    identifying a subset of the plurality of candidate attributes as the set of attributes according to a set of selection criteria;
    for each attribute of the set of attributes, associating the attribute with a subset of sentiment words from the extracted set of sentiment words.

3. The method of claim 1, wherein the sentiment trend visualization depicts the trend of determined sentiments for the first attribute over a time period.

4. The method of claim 3, further comprising:
    presenting for display a list of the identified set of attributes;
    receiving selection of a second attribute of the identified set of attributes, where the second attribute is different from the first attribute; and
    changing the sentiment trend visualization to depict a second trend of determined sentiments of the second attribute over time.

5. The method of claim 1, wherein the disseminated information includes a set of data records, the method further comprising:
    accessing a set of sentiment scores associated with the first attribute, where each sentiment score of the set of the sentiment scores expresses a sentiment associated with the first attribute of a respective data record of the set of data records at a respective time;
    aggregating a subset of sentiment scores of the set of sentiment scores within each time interval of a sequence of time intervals;
    computing, for a first time interval of the sequence of time intervals, a first aggregate score of a first subset of sentiment scores associated with the first time interval;
    wherein the sentiment trend visualization of the particular attribute comprises a graph of the first aggregate score.

6. The method of claim 1, wherein the trend of depicted sentiments comprises a set of indicators associated with the identified set of attributes, the method
    generating, for the first attribute, an indicator that comprises a set of connected cells, where each cell of the set of connected cells indicates a corresponding sentiment score related to the first attribute.

7. The method of claim 6, wherein each cell in the set of connected cells is associated with a corresponding data record in a set of data records determined from the disseminated information.

8. The method of claim 7, wherein the set of cells are ordered based on a set of characteristics related to the corresponding set of sentiment scores associated with the set of cells.

9. The method of claim 8, wherein the set of characteristics includes positiveness of the sentiment scores.

10. The method of claim 6, wherein each cell in the set of connected cells may be associated with visual indicators that indicate information about the corresponding sentiment score, the visual indicators including different colors corresponding to respective different sentiment scores.

11. A system comprising:
    a physical processor that executes machine readable instructions that cause the system to:
        identify, based on disseminated information from a first geographic region, an event occurring in the first geographic region, wherein the disseminated information from the first geographic region includes public commentary from the first geographic region;
determine a set of attributes related to the event;
extract a set of sentiment words relating to the identified event from the disseminated information, where the extracted set of sentiment words are in a local language of the first geographic region;
associate, for each attribute of the set of attributes, a sentiment from the set of sentiment words; and
cause display of a sentiment trend visualization that depicts a trend of determined sentiments for the first attribute, wherein the determined sentiments are based on the set of sentiment words for the first attribute.

12. The system of claim 11, wherein the sentiment trend visualization comprises a set of indicators associated with the identified set of attributes, and wherein the physical processor executes machine readable instructions to:
generate, for the first attribute, an indicator that comprises a set of connected cells, where each cell of the set of connected cells indicates a corresponding sentiment score related to the first attribute.

13. The system of claim 12, wherein each cell in the set of connected cells is associated with a corresponding data record in a set of data records determined from the disseminated information, and wherein the set of cells are ordered based on a set of characteristics related to the corresponding set of sentiment scores associated with the set of cells.

14. The system of claim 11, wherein the physical processor executes machine readable instructions that cause the system to:
access a set of sentiment scores associated with the first attribute, where each sentiment score of the set of the sentiment scores expresses a sentiment associated with the first attribute of a respective data record of the set of data records at a respective time;
aggregate a subset of sentiment scores of the set of sentiment scores within each time interval of a sequence of time intervals;
compute, for a first time interval of the sequence of time intervals, a first aggregate score of a first subset of sentiment scores associated with the first time interval;
wherein the sentiment trend visualization of the particular attribute comprises a graph of the first aggregate score.

15. A non-transitory machine-readable storage medium comprising machine readable instructions that, when executed by a processor, cause a system to:
identify, based on disseminated information from a first geographic region, an event occurring in the first geographic region, wherein the disseminated information from the first geographic region includes public commentary from the first geographic region;
determine a set of attributes related to the event;
extract a set of sentiment words relating to the identified event from the disseminated information, where the extracted set of sentiment words is in a local language of the first geographic region;
associate, for each attribute of the set of attributes, a sentiment from the set of sentiment words; and
cause display of a sentiment trend visualization that depicts a trend of determined sentiments for the first attribute, wherein the determined sentiments are based on the set of sentiment words for the first attribute.

16. The non-transitory machine-readable storage medium of claim 15, wherein the sentiment trend visualization comprises a set of indicators associated with the identified set of attributes, and wherein the machine readable instructions, when executed, cause the system to:
generate, for the first attribute, an indicator that comprises a set of connected cells, where each cell of the set of connected cells indicates a corresponding sentiment score related to the first attribute.

17. The non-transitory machine-readable storage medium of claim 16, wherein each cell in the set of connected cells is associated with a corresponding data record in a set of data records determined from the disseminated information, and wherein the set of cells is ordered based on a set of characteristics related to the corresponding set of sentiment scores associated with the set of cells.

18. The non-transitory machine-readable storage medium of claim 15, wherein the machine readable instructions, when executed, cause the system to:
access a set of sentiment scores associated with the first attribute, where each sentiment score of the set of the sentiment scores expresses a sentiment associated with the first attribute of a respective data record of the set of data records at a respective time;
aggregate a subset of sentiment scores of the set of sentiment scores within each time interval of a sequence of time intervals;
compute, for a first time interval of the sequence of time intervals, a first aggregate score of a first subset of sentiment scores associated with the first time interval;
wherein the sentiment trend visualization of the particular attribute comprises a graph of the first aggregate score.

19. The non-transitory machine-readable storage medium of claim 15, wherein the machine readable instructions, when executed, cause the system to:
provide for display a list of the identified set of attributes;
receiving selection of a second attribute of the identified set of attributes, where the second attribute is different from the first attribute; and
changing the sentiment trend visualization to depict a second trend of determined sentiments of the second attribute over time.

20. The non-transitory machine-readable storage medium of claim 15, wherein the identified event comprises a previously unknown event.

* * * * *